United States Patent
Yoshida

(10) Patent No.: US 9,522,839 B2
(45) Date of Patent: Dec. 20, 2016

(54) OPTICAL FIBER BASE MATERIAL MANUFACTURING METHOD

(71) Applicant: Shin-Etsu Chemical Co., Ltd., Tokyo (JP)

(72) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/738,938

(22) Filed: Jun. 15, 2015

(65) Prior Publication Data

US 2015/0360992 A1 Dec. 17, 2015

(30) Foreign Application Priority Data

Jun. 16, 2014 (JP) .................................. 2014-123040

(51) Int. Cl.
*C03B 37/014* (2006.01)

(52) U.S. Cl.
CPC ....... *C03B 37/0142* (2013.01); *C03B 2207/52* (2013.01); *C03B 2207/64* (2013.01); *C03B 2207/66* (2013.01); *C03B 2207/70* (2013.01); *Y02P 40/57* (2015.11)

(58) Field of Classification Search
CPC ............. C03B 37/0142; C03B 2207/52; C03B 2207/66; C03B 2207/70; C03B 2207/62
See application file for complete search history.

(56) References Cited

U.S. PATENT DOCUMENTS

| | | | | |
|---|---|---|---|---|
| 4,388,094 A | * | 6/1983 | Carpenter | C03B 19/1415 118/729 |
| 4,568,370 A | * | 2/1986 | Powers | C03B 37/014 65/403 |
| 4,684,384 A | * | 8/1987 | Berkey | C03B 37/01413 427/163.2 |
| 5,116,400 A | | 5/1992 | Abbott et al. | |
| 5,211,732 A | * | 5/1993 | Abbott | C03B 37/0142 65/421 |
| 5,958,102 A | * | 9/1999 | Shimada | C03B 37/0142 65/382 |
| 6,748,769 B2 | * | 6/2004 | Ooishi | C03B 37/0142 65/421 |

(Continued)

FOREIGN PATENT DOCUMENTS

| | | | |
|---|---|---|---|
| JP | 04292434 A | * | 10/1992 |
| JP | 2809905 B2 | | 10/1998 |

(Continued)

*Primary Examiner* — Jodi C Franklin

(57) ABSTRACT

Provided is an optical fiber base material manufacturing method that includes, while rotating a starting member formed by fusing both ends of a core rod to dummy rods on an axis of the starting member, moving the starting member and burners back and forth relative to each other and depositing glass microparticles on a surface of the starting member. This method also includes setting two or more axes as back and forth movement axes allowing for back and forth movement relative to the starting member; providing a burner facing the starting member on each of the axes; causing each burner to traverse the starting member to an end of the starting member; and changing a position where at least two burners pass by each other during the traversing movement, in a longitudinal direction of the starting member.

2 Claims, 10 Drawing Sheets

(56) References Cited

U.S. PATENT DOCUMENTS

| | | | | |
|---|---|---|---|---|
| 6,837,076 | B2* | 1/2005 | Hawtof | C03B 19/1423 239/418 |
| 6,895,783 | B2* | 5/2005 | Ohishi | C03B 37/0142 65/421 |
| 7,143,612 | B2* | 12/2006 | Ishihara | C03B 37/01202 65/377 |
| 8,230,701 | B2* | 7/2012 | Groh | C03B 19/1423 65/413 |
| 8,387,416 | B2* | 3/2013 | Roba | C03B 37/01202 65/413 |
| 2003/0003228 | A1* | 1/2003 | Ooishi | C03B 37/0142 427/180 |
| 2004/0093905 | A1* | 5/2004 | Nakamura | C03B 37/01413 65/382 |
| 2006/0048546 | A1* | 3/2006 | Hunermann | C03B 37/0142 65/531 |
| 2006/0086147 | A1* | 4/2006 | Ooishi | C03B 37/0142 65/382 |
| 2007/0169514 | A1* | 7/2007 | Ooishi | C03B 37/0142 65/377 |
| 2013/0074552 | A1* | 3/2013 | Yamada | C03B 37/0142 65/421 |

FOREIGN PATENT DOCUMENTS

| | | | |
|---|---|---|---|
| JP | 3581764 | B2 | 10/2004 |
| JP | 4690979 | B2 | 6/2011 |

* cited by examiner

OPTICAL FIBER BASE MATERIAL MANUFACTURING METHOD

The contents of the following Japanese patent application are incorporated herein by reference: NO. 2014-123040 file in Jun. 16, 2014.

BACKGROUND

1. Technical Field

The present invention relates to a manufacturing method of an optical fiber base material that realizes high-speed manufacturing of the optical fiber base material, and also produces an optical fiber base material that has a uniform thickness in the longitudinal direction of a starting member.

2. Related Art

Conventionally, a variety of methods have been proposed for manufacturing an optical fiber base material. Among these methods, there is an outside vapor deposition (OVD) method for obtaining an optical fiber base material that includes rotating on its axis a starting member that is a core rod fused at both ends to dummy rods, moving the starting member and a plurality of burners back and forth relative to each other, depositing glass microparticles on the surface of the starting member, dehydrating the resulting material in an electric furnace, and performing sintering to obtain the optical fiber base material. This OVD method is commonly used because it is capable of mass-producing an optical fiber base material with a relatively desired refractive index distribution and a large opening diameter.

With this OVD technique, in order to improve the equipment productivity, ideas such as increasing the number of burners and increasing the deposition rate have been considered.

Patent Document 1 proposes a method that includes arranging burners along the entire region of the starting member that is to become the final product, and improving the deposition rate by partially traversing this portion of the starting member with the burners.

With this method, the number of burners can be significantly increased and the deposition rate can be improved, but since each burner traverses only a predetermined portion of the product region, there is a significant effect resulting from individual differences between the burners and variation in the flow rates and there is fluctuation in the deposition thickness of the glass microparticles at different longitudinal positions of the starting member, and therefore it is necessary to perform post-processing that includes an additional step of grinding the surface of the base material.

On the other hand, a method for improving the deposition rate by having each burner traverse the entire product region has been proposed that includes arranging a plurality of burners with movement axes along the starting member and around the circumference of the starting member.

With this method, since the burners traverse the entire product region, there is less likely to be fluctuation in the deposition thickness of the glass microparticles in the longitudinal direction due to variations in the gas flow rates or individual differences among the burners, but the burners must pass by each other during deposition, and the portions where the burners pass by each other experience a decrease in the deposition efficiency due to the interference between the flames of the burners and fluctuation in the deposition in the longitudinal direction.

To deal with this problem, Patent Document 2 proposes a method that includes increasing the speed at which the burners pass by each other, in order to decrease the effect of interference when the burners pass by each other.

However, with this method, the burners pass by each other at the same position every time the starting member is traversed, and therefore it is easy for fluctuation to occur between the positions where the burners pass by each other and positions where the burners do not pass by each other. In particular, current generation base materials have been becoming larger, and even when there is only a small fluctuation, this small fluctuation is amplified and results in a large fluctuation.

As another example, Patent Document 3 proposes a method that includes changing the movement range traversed by the burners for each movement axis, but with this method, there is an increase in the amount of non-product regions, which are the cone-shaped regions at the ends.

Patent Document 1: Japanese Patent No. 2809905
Patent Document 2: Japanese Patent No. 3581764
Patent Document 3: Japanese Patent No. 4690979

It is an objective of the present invention to provide an optical fiber base material manufacturing method that enables manufacturing of optical fiber base material at high speed and obtaining of a uniform deposition thickness in the longitudinal direction even when the burners are arranged with a plurality of movement axes.

SUMMARY

According to an aspect of the present invention, provided is An optical fiber base material manufacturing method that includes, while rotating a starting member formed by fusing both ends of a core rod to dummy rods on an axis of the starting member, moving the starting member and burners back and forth relative to each other and depositing glass microparticles on a surface of the starting member, the method comprising setting two or more axes as back and forth movement axes allowing for back and forth movement relative to the starting member; providing a burner facing the starting member on each of the axes; causing each burner to traverse the starting member to an end of the starting member; and changing a position where at least two burners pass by each other during the traversing movement, in a longitudinal direction of the starting member.

DESCRIPTION OF EXEMPLARY EMBODIMENTS

Figure 1:
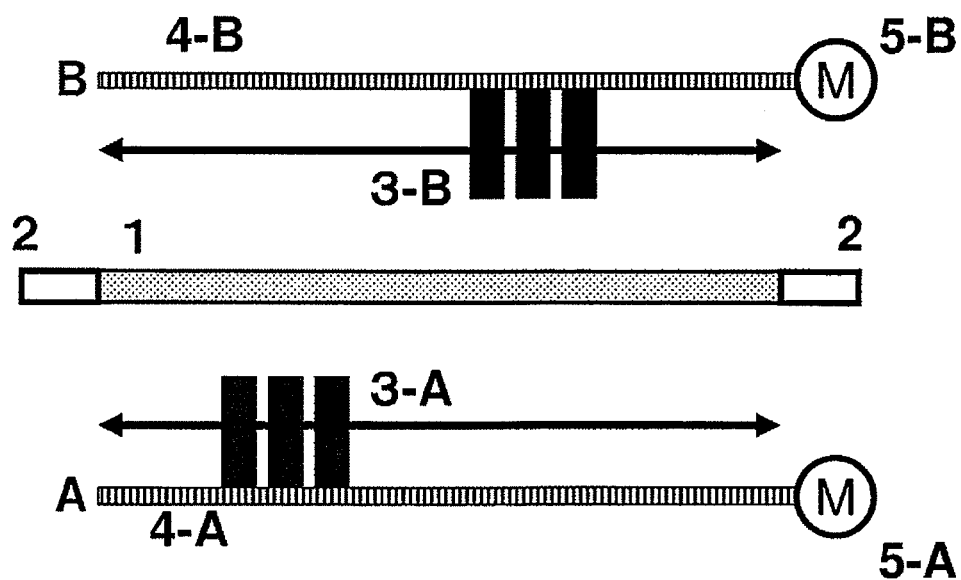
FIG. 1 is a schematic planar view of an example of the manufacturing apparatus used to manufacture the optical fiber base material according to the present invention.

When depositing glass microparticles on the surface of a starting member with burners that traverse along movement axes arranged in two or more axial directions, there is interference between the flames when these burners pass by each other, and the deposition efficiency decreases in the regions where the burners pass by each other. As the deposition progresses, when the burners traverse the starting member in a manner to pass by each other at the same position every time, the regions experiencing the decrease in deposition efficiency overlap and a large fluctuation in the deposition thickness occurs in the longitudinal direction.

Because of this, it has been determined that in order to realize a uniform deposition thickness, it is very important to gradually change the positions at which the burners pass by each other in a manner to not overlap in the longitudinal direction.

Therefore, when manufacturing an optical fiber base material by rotating a starting member obtained by using a core rod to dummy rods at both ends around its axis, moving the starting member and the burners back and forth relative to each other, and depositing glass microparticles on the surface of the starting member, if two or more axes are set as axes for the relative back and forth movement, a burner is provided on each axis facing toward the starting member, and the positions at which the burners pass by each other in the longitudinal direction of the base material are changed by changing the movement speed of the burner on each axis every time the burners traverse the starting member, then the positions at which the burners pass by each other are different and not overlapping every time the burners traverse the starting member, even when the number of burners is increased, and therefore an optical fiber base material can be obtained that has a uniform deposition thickness without experiencing fluctuation of the deposition thickness in the longitudinal direction.

Methods considered for changing the positions at which the burners pass by each other include, in addition to a method for adjusting the movement speed of the burners, a method that includes adjusting the time during which the burners stop at the ends of the base material and a method that includes adjusting the positions traversed by the burners, but the former method has a problem that increasing the time during which deposition is not performed while the burners are stopped decreases the producibility, and the latter method has a problem that the length of the ineffective cone portions at the ends of the base material are increased, thereby decreasing the product yield.

With the method that includes adjusting the movement speed of the burners according to the present invention, the above problems are not experienced and the movement speed adjustment has little effect on the deposition speed and deposition density, and therefore it is unlikely for problems such as cracking during deposition or layer peeling during vitrification to occur when the movement speed is changed significantly for each deposition layer.

More preferably, the positions where the burners pass by each other are determined in advance such that the positions where the burners pass by each other do not overlap in the longitudinal direction, and a pattern is set in advance for the movement speed of the burners for each instance of traversing the starting member such that, for each movement axis, the burners pass by each other at the determined positions.

Hereinafter, some embodiments of the present invention will be described. The embodiments do not limit the invention according to the claims, and various aspects are possible.

The apparatus and method for manufacturing an optical fiber base material according to the present invention are described in detail with reference to the drawings.

Figure 2:
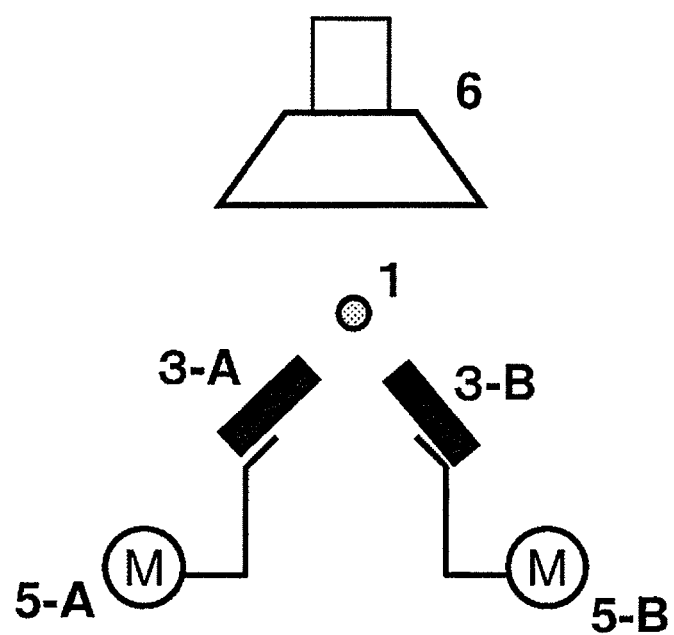
FIG. 2 is a schematic side view of the apparatus shown in FIG. 1

FIG. 1 is a schematic planar view of an example of the manufacturing apparatus used to manufacture the optical fiber base material according to the present invention, and FIG. 2 is a schematic side view of the same apparatus. In FIG. 1, the starting member is obtained by fusing a core rod 1 to dummy rods 2 at both ends, and is supported to rotate freely on its axis by a base support member (not shown).

Two axes (A and B) are set as the movement axes of the burners along the starting member, and burners 3 (3-A and 3-B) are arranged to be freely movable along the starting member according to burner guide mechanisms 4 (4-A and 4-B). Movement motors 5 (5-A and 5-B) are provided separately to the respective movement axes, and each movement motor can operate independently.

An optical fiber porous base material is formed by providing the burners 3, which use normal oxyhydrogen, with optical fiber raw material, e.g. a vapor of $SiCl_4$, and a combustion gas (hydrogen gas and oxygen gas), synthesizing glass microparticles (soot) through hydrolysis in the oxyhydrogen flames, and discharging the soot toward the starting member to be deposited on the starting member. The exhaust gas and silica microparticles that were not deposited are expelled to the outside of the system, through an exhaust hood 6 arranged above.

The following describes the method of manufacturing the optical fiber base material according to the present invention using the outside vapor deposition (OVD) technique.

First, while rotating the starting member, which is supported by a base support section (not shown), on its axis using a rotation motor, flames are discharged from the burners 3 toward the starting member and soot is deposited on the starting member. The optical fiber porous base material is then manufactured by forming the deposition layer, by using the burner guide mechanisms 4 to move the burners 3 back and forth along the longitudinal direction of the starting member.

The optical fiber porous base material obtained in this manner is passed through a heating furnace made from a heater and a thermal insulation material to undergo dehydration and transparent vitrification, thereby obtaining the optical fiber base material.

EMBODIMENT EXAMPLES

First Embodiment

Optical fiber porous glass base material was manufactured according to OVD, using an apparatus such as described in FIGS. 1 and 2. The starting member was obtained by fusing a core rod with an outer diameter of 50 mm and a length of 3000 mm at both ends to dummy rods that each have an outer diameter of 50 mm and a length of 500 mm, and soot deposition was performed until reaching an outer diameter of 300 mm.

The burners used were multi-nozzle deposition burners, in which small-diameter combustion-assisting gas discharge nozzles are housed within a combustible gas discharge port, and three of these burners were arranged at 150 mm intervals on each of the A axis and the B axis.

Figure 3:
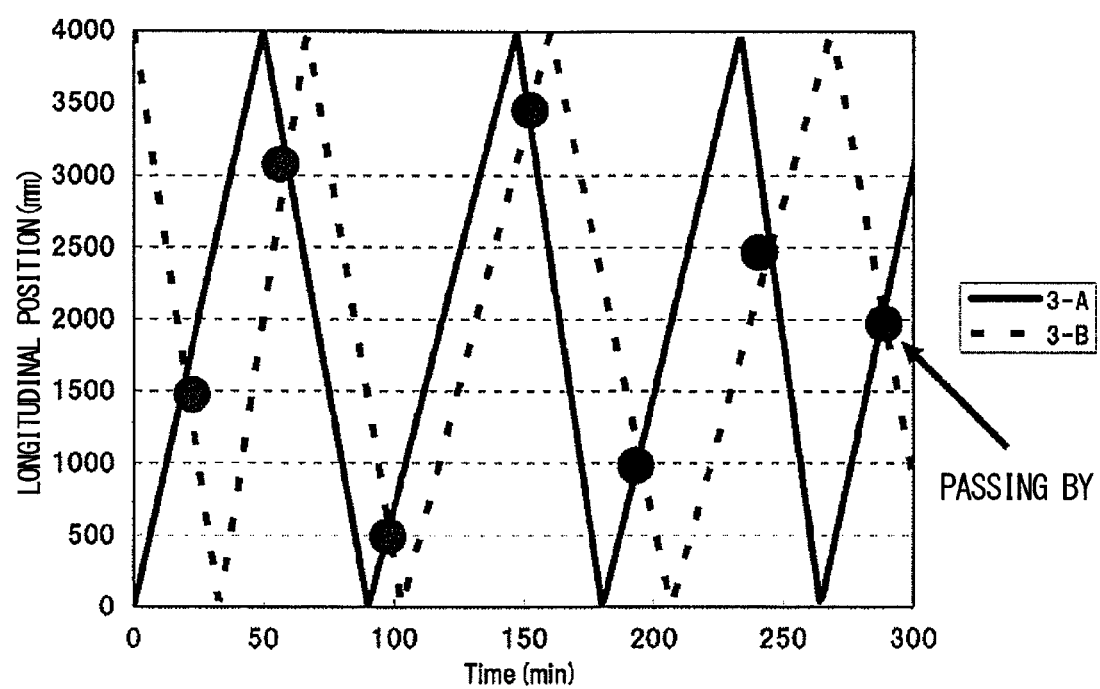
FIG. 3 is a graph showing positions where burners pass by each other and a traversing state of the burners, in an embodiment example where two axes are set as the movement axes of the burners.
Figure 4:
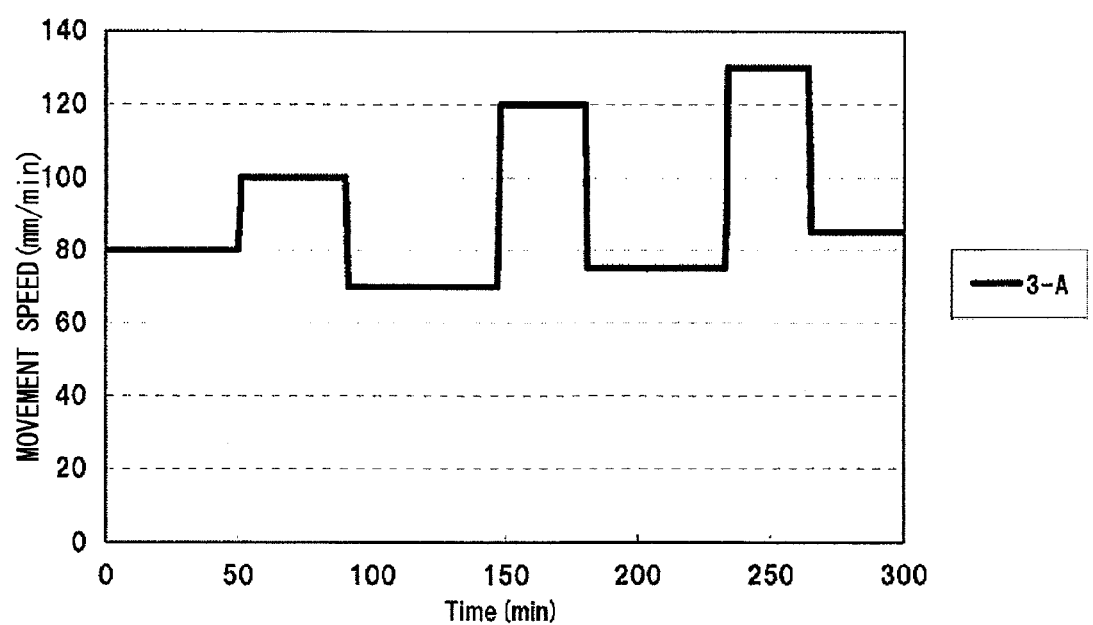
FIG. 4 is a graph showing change in the movement speed of the burner (3-A) moving on the A axis.
Figure 5:
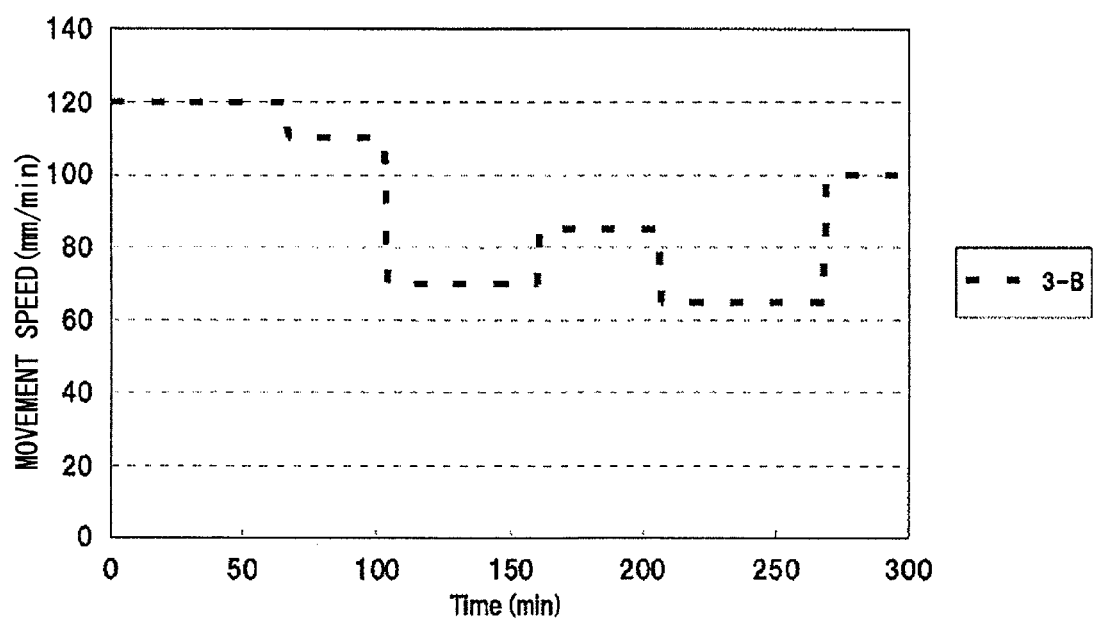
FIG. 5 is a graph showing change in the movement speed of the burner (3-B) moving on the B axis.

As shown in FIG. 3, the deposition was performed with the movement speed on the A axis being set as shown in FIG. 4 and the movement speed on the B axis being set as shown in FIG. 5, such that the positions where the burners pass by each other on the A axis and the B axis do not overlap in the longitudinal direction of the starting member. In FIG. 3, the solid line indicates the movement path of the burner 3-A on the A axis, the dashed line indicates the movement path of the burner 3-B on the B axis, and the black circles indicate the positions where the burners pass by each other, which are set to different positions each time the burners traverse the starting member. The settings for the movement speeds on the A axis and the B axis in FIGS. 4 and 5 are not limited to the example shown in FIG. 3, and can be changed in a variety of ways as long as the positions where the burners pass by each other do not overlap.

Figure 6:
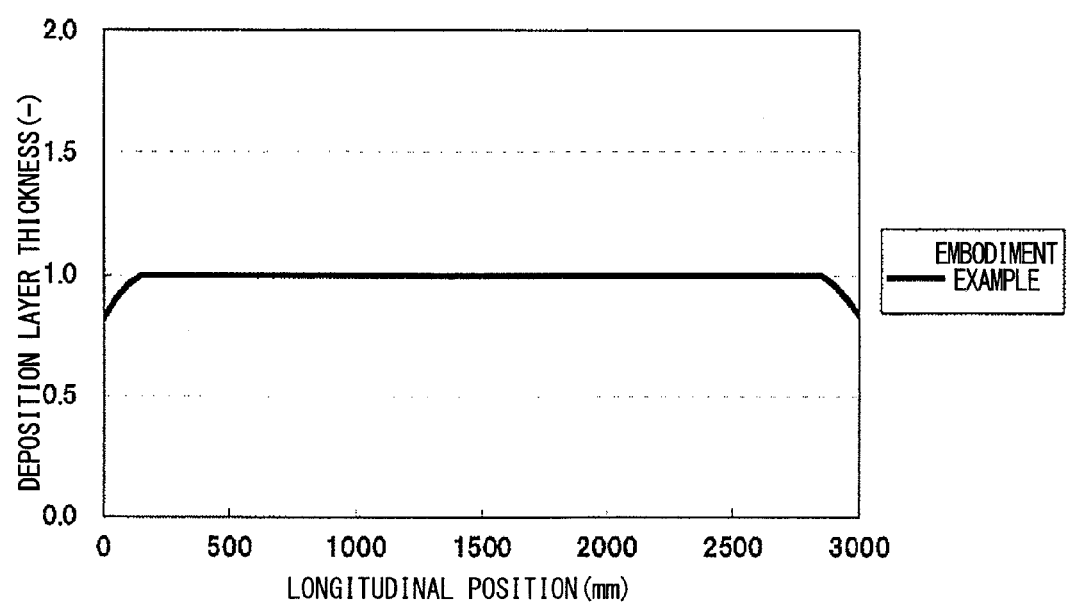
FIG. 6 is a graph showing change in the deposition thickness in the longitudinal direction of a base material obtained from the embodiment example.

When the soot is deposited on the starting member in this manner, as shown in FIG. 6, the thickness at the ends is somewhat insufficient, but the deposition thickness is constant across the entire product region excluding the end portions, and an extremely favorable base material was obtained. FIG. 6 shows change of the deposition thickness at positions in the longitudinal direction of the product region, using a ratio in which the deposition thickness at a position of 500 mm in the longitudinal direction is set as 1. In this way, by changing the movement speed on the A axis and the movement speed on the B axis to change the positions where the burners pass by each other every time the burners traverse the starting member, the positions where the burners pass by each other do not overlap in the longitudinal direction of the base material. In this way, beneficial effects are realized, such as obtaining an optical fiber porous base material with uniform deposition thickness in the longitudinal direction and manufacturing the optical fiber porous base material at high speed.

First Comparative Example

Optical fiber porous glass base material was manufactured according to OVD, using the same starting member and apparatus as in the first embodiment.

Figure 7:
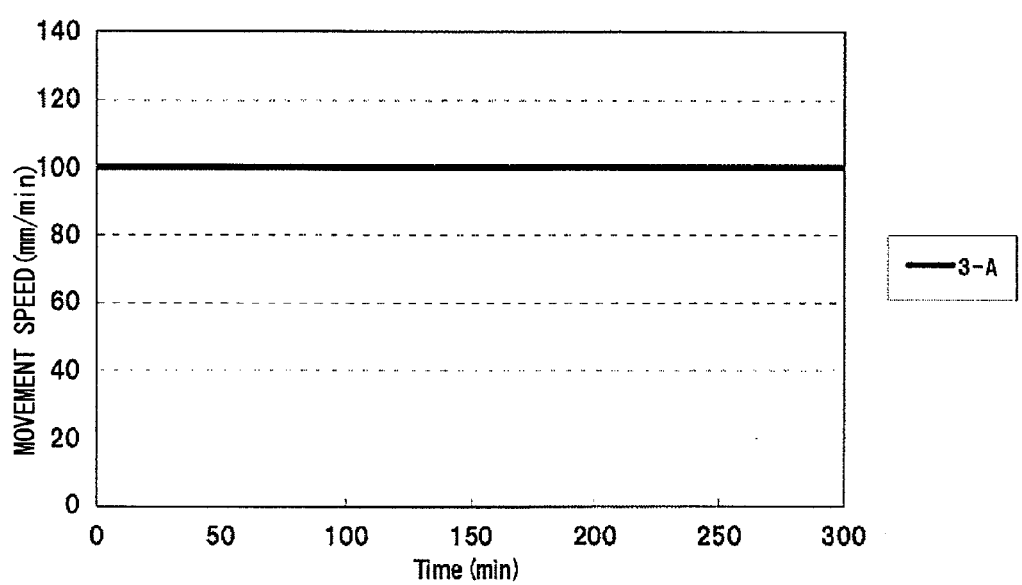
FIG. 7 is a graph showing change in the movement speed of the burner (3-A) moving on the A axis, in a comparative example in which two axes are set as the movement axes of the burners.
Figure 8:
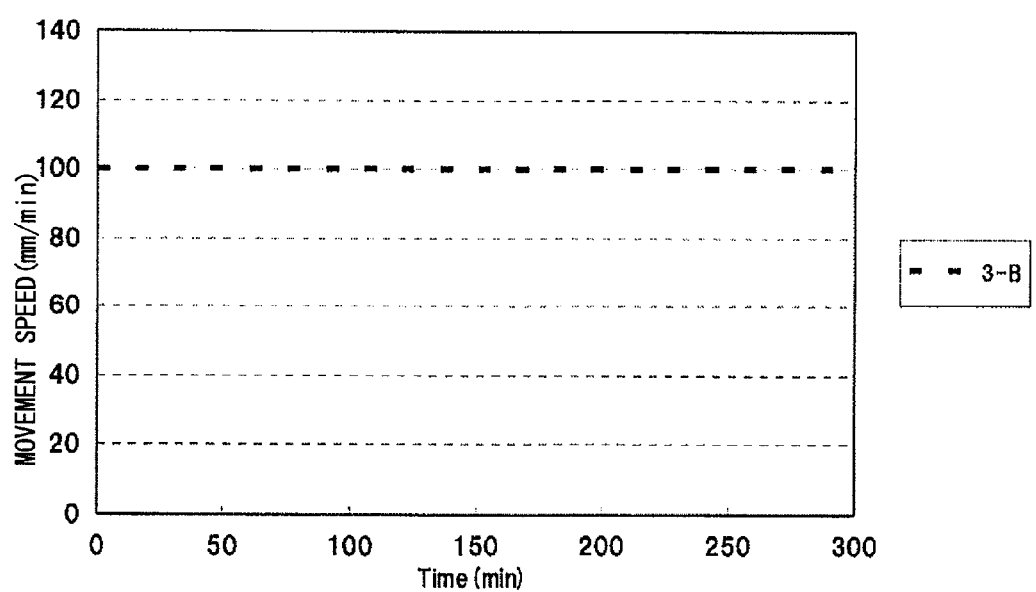
FIG. 8 is a graph showing change in the movement speed of the burner (3-B) moving on the B axis.

As shown in FIGS. 7 and 8, the deposition was performed in the same manner as in the first embodiment, except that the movement speed on the A axis and the movement speed on the B axis were both fixed at 100 mm/min.

Figure 9:
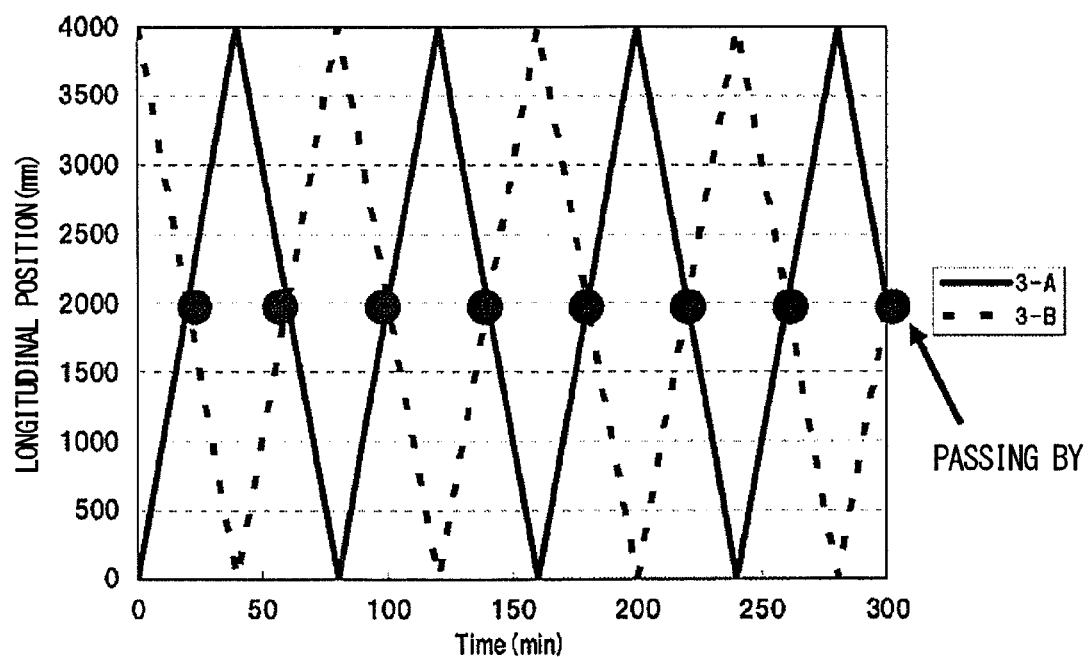
FIG. 9 is a graph showing the position where burners pass by each other and the traversing state of the burners, in a comparative example.
Figure 10:
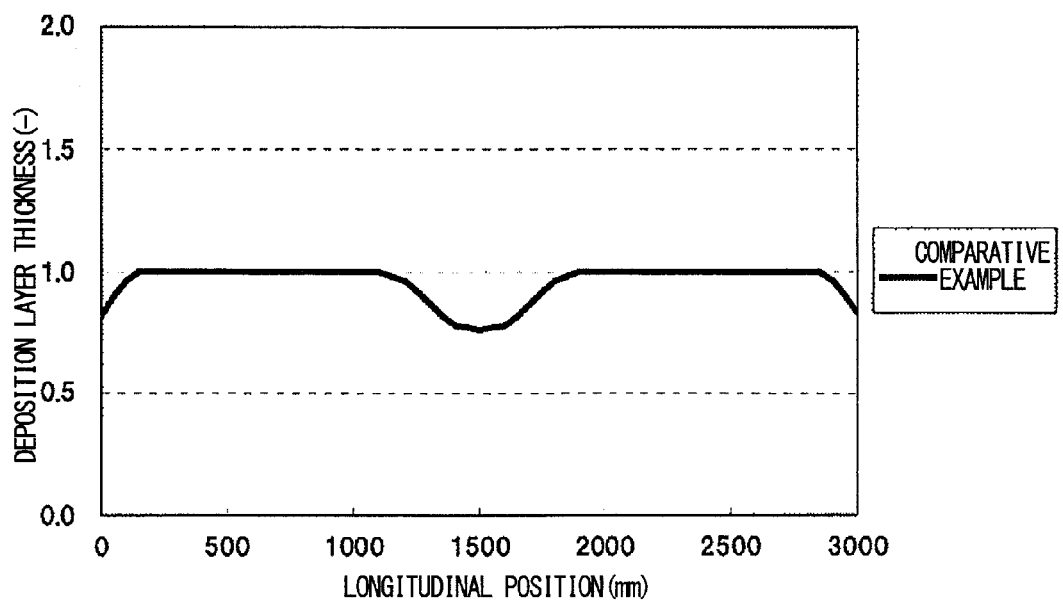
FIG. 10 is a graph showing change in the deposition thickness in the longitudinal direction of a base material obtained from a comparative example.

As a result, as shown in FIG. 9, the positions where the burners on the A axis and the B axis passed by each other overlapped at the longitudinal position of 2000 mm of the base material every time the burners traversed the starting member, and therefore, as shown in FIG. 10, the thickness of the deposition layer near the central region where the positions where the burners pass by each other overlap was reduced.

The above describes an example of the optical fiber base material manufacturing method according to the present invention in which two axes are used as the movement axes of the burners and the movement speed is different for each axis, but instead, if the phase difference between the burners is greater than 0° and less than 180°, the movement speed of each burner may be the same. In a case where the movement speed of each burner is the same, a phase difference between the burners of 0° indicates a state in which the burner 3-A positioned on the A axis and the burner 3-B positioned on the B axis move at the same positions in the longitudinal directions. Furthermore, in a case where the movement speed of each burner is the same, a phase difference between the burners of 180° indicates the state of the first comparative example shown in FIG. 9.

In other words, in a case where the phase difference between the burner 3-A positioned on the A axis and the burner 3-B positioned on the B axis is greater than 0° and less than 180°, the positions where the burner 3-A and the burner 3-B pass by each other are two points shifted respectively to the right and to the left of the center, instead of both being at the center of the starting member. In this way, even when the movement speeds of the burners are different, the burners are caused to pass by each other at two different positions instead of at one position if the phases of the burners are different. In this way, it is possible to restrict the decrease in the deposition thickness at the position where the burners pass by each other. The operation of setting the phase different between the two burners to be greater than 0° and less than 180° may be combined with the operation of making the movement speeds of the burners different from each other.

The embodiment above describes an example in which the movement speeds of the burners are changed every time the burners traverse the starting member, but the movement speeds of the burners are fixed during a single traversing movement. However, the present invention is not limited to this, and the movement speeds of the burners may be changed during the traversing movement.

The above describes an example of the optical fiber base material manufacturing method according to the present embodiment in which two axes are used as the movement axes of the burners, but instead three or four axes may be used as the movement axes. In such a case, it is only necessary that the positions where burners provided on at least two of the axes pass by each other not overlap. As the number of axes increases, it becomes more complicated to set the movement speed on each axis such that none of the positions where burners provided on any of the axes pass by each other overlap, but this setting can still be achieved in the same manner. In this way, it is possible to obtain optical fiber base material with a uniform deposition thickness in the longitudinal direction, and to manufacture the optical fiber base material at high speed.

LIST OF REFERENCE NUMERALS

1: core rod, 2: dummy rod, 3: burner, 4: burner guide mechanism, 5: movement motor, 6: exhaust hood

What is claimed is:

1. An optical fiber base material manufacturing method that includes, while rotating a starting member formed by fusing both ends of a core rod to dummy rods on an axis of the starting member, moving the starting member and burners back and forth relative to each other and depositing glass microparticles on a surface of the starting member, the method comprising:
   setting two or more axes as back and forth movement axes allowing for back and forth movement relative to the starting member;
   providing a burner facing the starting member on each of the axes, including a first burner and a second burner;

determining, in advance of burner movement, a pattern for the movement speeds of the first burner and the second burner such that the positions where the burners pass by each other are different every time a traversing movement occurs and evenly distributed in the longitudinal direction;

causing the first burner and the second burner to traverse the starting member to an end of the starting member at least three times; and changing movement speeds of the first burner and the second burner during the traversing movement in accordance with the pattern.

2. The optical fiber base material manufacturing method according to claim 1, wherein a phase difference between the at least two burners during the traversing movement is greater than 0° and less than 180°.

* * * * *